(12) United States Patent
Chappell et al.

(10) Patent No.: US 7,289,902 B2
(45) Date of Patent: Oct. 30, 2007

(54) THREE DIMENSIONAL BALANCE ASSEMBLY

(75) Inventors: Charles D. Chappell, Treasure Island, FL (US); Robert H. Fall, St. Petersburg, FL (US)

(73) Assignee: Honeywell International Inc., Morristown, NJ (US)

( * ) Notice: Subject to any disclaimer, the term of this patent is extended or adjusted under 35 U.S.C. 154(b) by 336 days.

(21) Appl. No.: 11/004,529

(22) Filed: Dec. 3, 2004

(65) Prior Publication Data

US 2006/0058962 A1    Mar. 16, 2006

Related U.S. Application Data

(60) Provisional application No. 60/608,819, filed on Sep. 10, 2004.

(51) Int. Cl.
*G01C 21/26* (2006.01)
*G01C 21/28* (2006.01)

(52) U.S. Cl. .................. 701/124; 701/220; 73/460
(58) Field of Classification Search .................. None
See application file for complete search history.

(56) References Cited

U.S. PATENT DOCUMENTS

| | | |
|---|---|---|
| 3,039,316 A | 6/1962 | Slater |
| 3,056,303 A | 10/1962 | Naylor |
| 3,365,942 A | 1/1968 | Blazek |
| 3,439,546 A | 4/1969 | Baker et al. |
| 3,576,124 A | 4/1971 | O'Connor |
| 3,670,585 A | 6/1972 | Alexander et al. |
| 3,769,710 A | 11/1973 | Reister |
| 3,782,167 A | 1/1974 | Stuelpnagel |
| 4,003,265 A | 1/1977 | Craig et al. |
| 4,150,579 A | 4/1979 | Vaughn |
| 4,244,215 A | 1/1981 | Merhav |

(Continued)

FOREIGN PATENT DOCUMENTS

GB     866473     4/1961

(Continued)

OTHER PUBLICATIONS

Benbasat, "An Inertial Measurement Unit for User Interfaces", Sep. 8, 2000, pp. 1-100, Publisher: Massachusetts Institute of Technology, Published in: MA, USA.

(Continued)

*Primary Examiner*—Michael J. Zanelli
(74) *Attorney, Agent, or Firm*—Fogg & Powers LLC; J. Patrick Kendrick

(57) ABSTRACT

A three-dimensional balance assembly is provided. The assembly includes a center shaft, two or more eccentric weighted shafts encompassing the center shaft and a first and a second locking mechanism that lock each weighted shaft into any rotational location. Each eccentric weighted shaft includes at least one eccentric weight. The two or more eccentric weighted shafts are independently rotatable around the center shaft to balance the assembly in two dimensions. The center shaft includes a first and a second bore extending inwardly from each end of the center shaft or a single bore all the way through the shaft. The first and second bores are adapted to receive and secure one or more axial weights and balance the assembly in a third dimension.

55 Claims, 6 Drawing Sheets

U.S. PATENT DOCUMENTS

| | | | |
|---|---|---|---|
| 4,515,486 A | 5/1985 | Ide | |
| 4,671,650 A | 6/1987 | Hirzel et al. | |
| 4,711,125 A | 12/1987 | Morrison | |
| 4,723,735 A | 2/1988 | Eisenhaure et al. | |
| 4,917,330 A | 4/1990 | Dulat et al. | |
| 5,067,084 A | 11/1991 | Kau | |
| 5,088,825 A | 2/1992 | Derry et al. | |
| 5,099,430 A * | 3/1992 | Hirsch | 73/462 |
| 5,319,577 A | 6/1994 | Lee | |
| 5,357,437 A | 10/1994 | Polvani | |
| 5,396,326 A | 3/1995 | Knobbe et al. | |
| 5,710,559 A | 1/1998 | Krogmann | |
| 5,894,323 A | 4/1999 | Kain et al. | |
| 6,172,665 B1 | 1/2001 | Bullister | |
| 6,481,672 B1 | 11/2002 | Goodzeit et al. | |
| 6,594,623 B1 | 7/2003 | Wang et al. | |
| 6,594,911 B2 | 7/2003 | Brunstein et al. | |
| 6,629,778 B1 | 10/2003 | Enderle et al. | |
| 6,741,209 B2 | 5/2004 | Lee | |
| 6,826,478 B2 | 11/2004 | Riewe et al. | |
| 7,003,399 B1 | 2/2006 | Chappell | |
| 2002/0077189 A1 | 6/2002 | Tuer et al. | |
| 2003/0120425 A1 | 6/2003 | Stanley et al. | |
| 2004/0015323 A1 | 1/2004 | Boyton | |
| 2004/0075737 A1 | 4/2004 | Kirby | |
| 2004/0089083 A1 | 5/2004 | Bailey | |
| 2004/0212803 A1 | 10/2004 | Siegl et al. | |

FOREIGN PATENT DOCUMENTS

| | | |
|---|---|---|
| GB | 878939 | 10/1961 |
| GB | 1015681 | 1/1966 |
| GB | 1284195 | 8/1972 |
| GB | 2166920 | 5/1986 |
| WO | 9505547 | 2/1995 |
| WO | 2004023150 | 3/2004 |

OTHER PUBLICATIONS

El-Sheimy et al., "Structural Monitoring Using Wirelessly Connected MEMS-Based Snesors-Towards System Development", Feb. 18, 2003, pp. 1-10, Publisher: ICPCM, Published in: Cairo, Egypt.

IBM Corp., "The Tracking Cube: A Three Dimensional Input Device", Aug. 1, 1989, pp. 91-95, vol. 32, No. 3B, Publisher: IBM Technical Disclosure Bulletin, Published in: NY, US.

Ng, "The Optical Mouse as a Two-Dimensional Displacement Sensor", "Sensors and Actuators A", Oct. 1, 2003, pp. 21-25, vol. 107, No. 1, Publisher: Elseveier Sequoia S.A., Published in: Lausanne, CH.

* cited by examiner

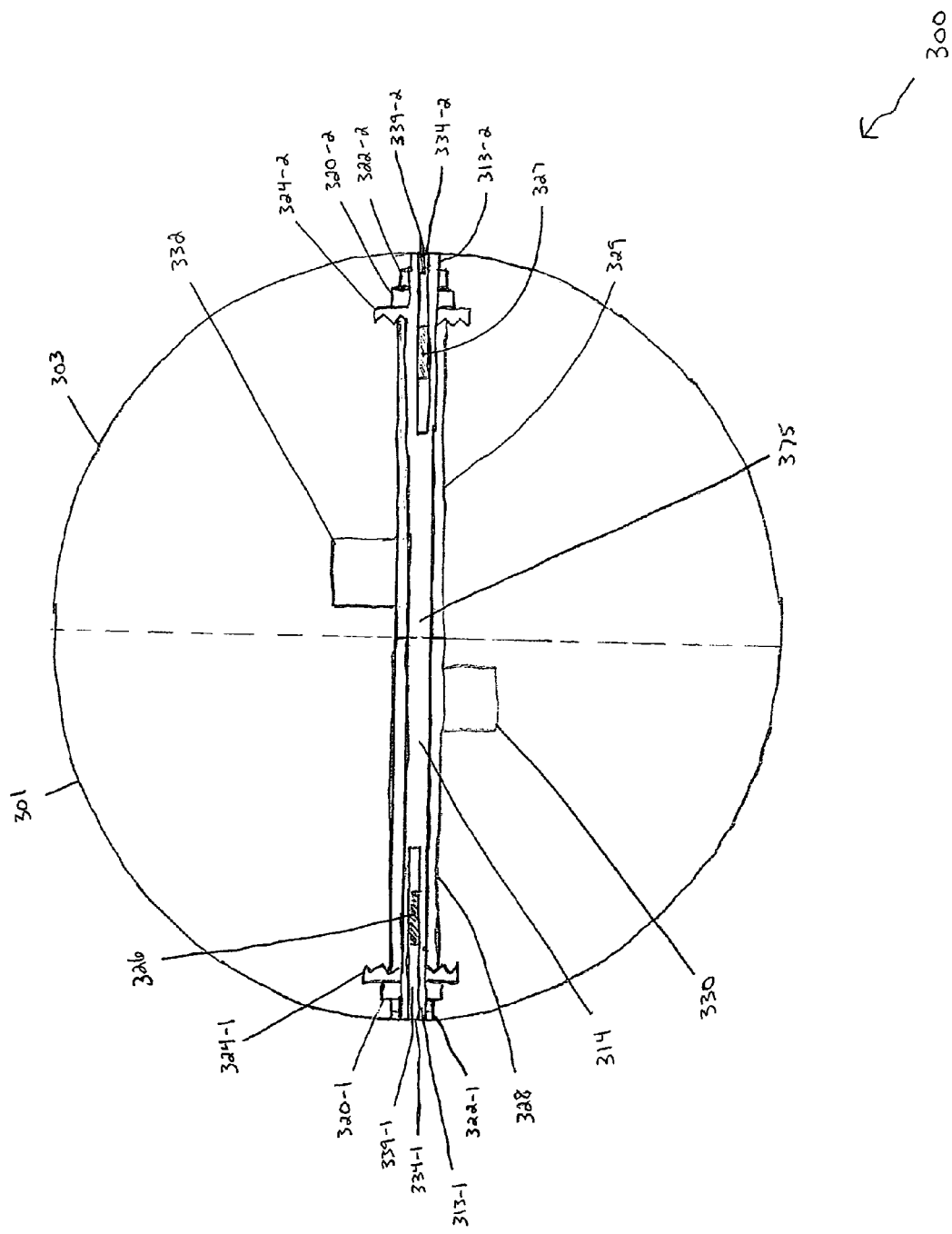

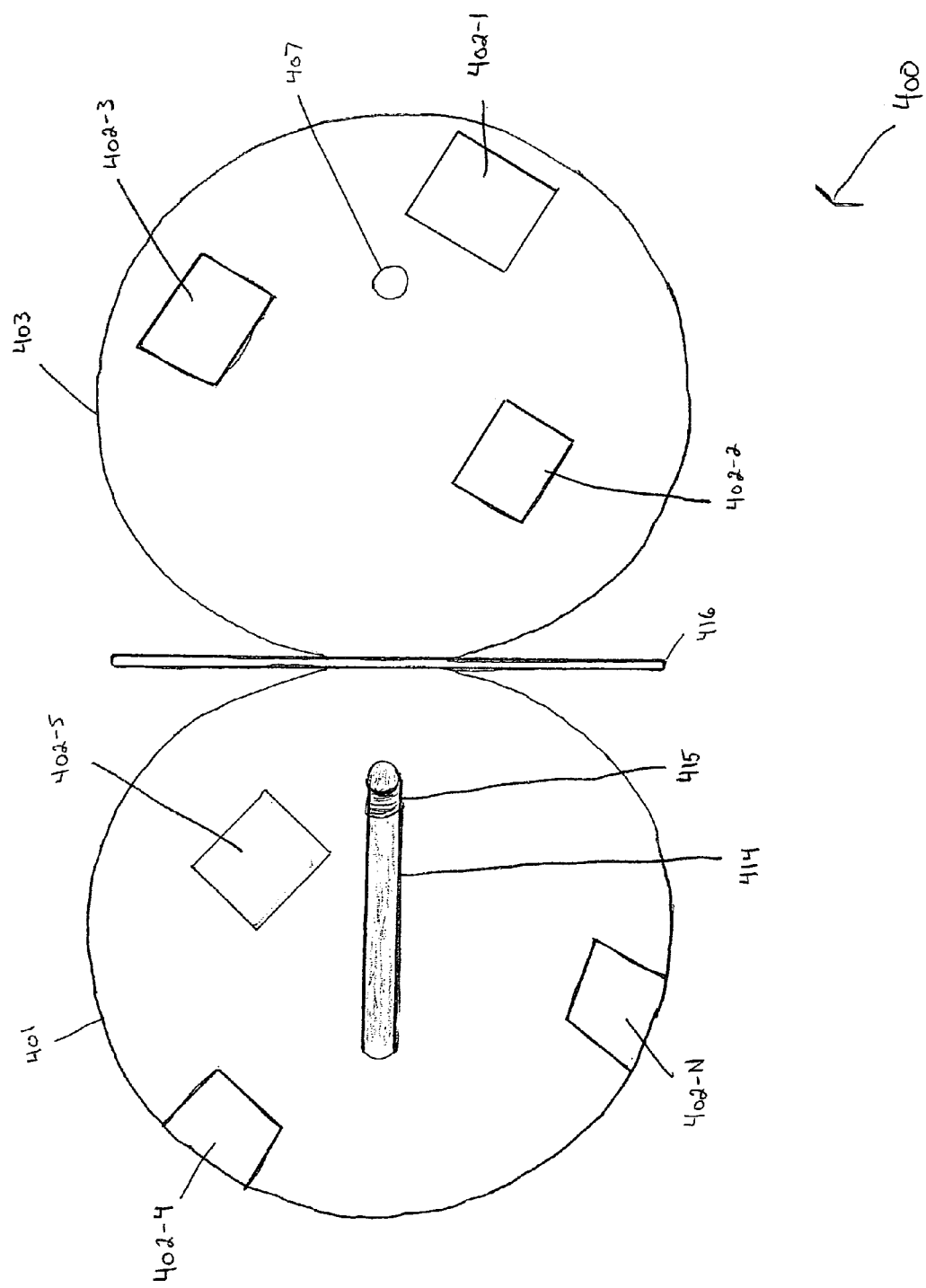

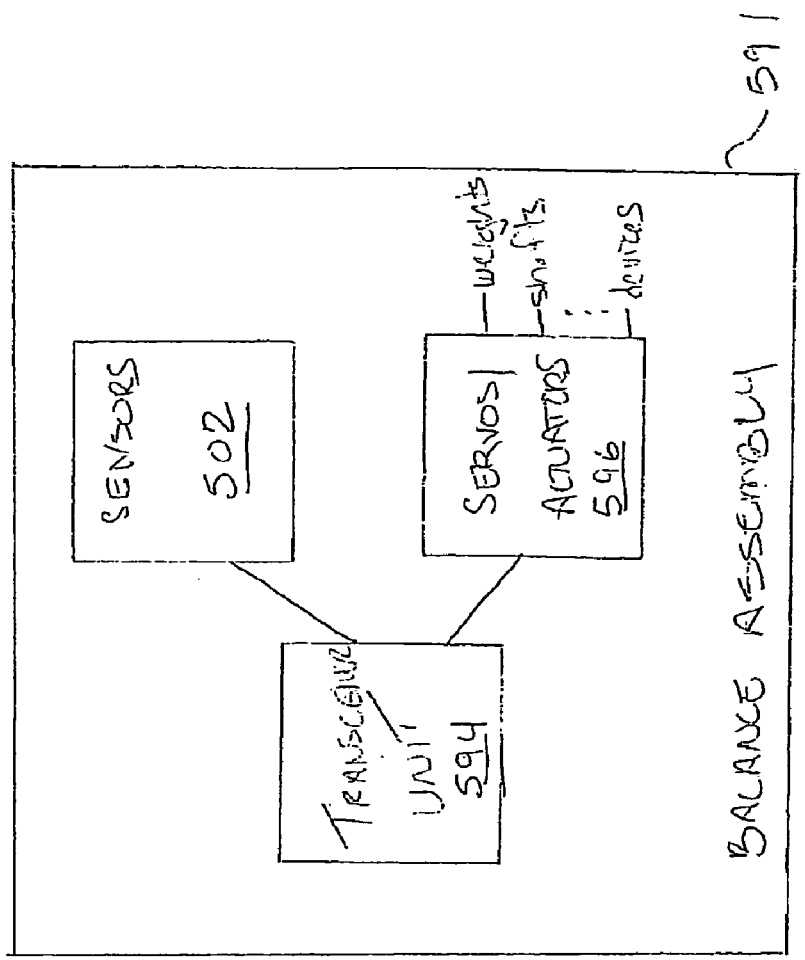
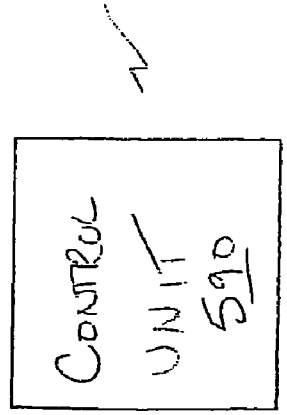
FIGURE 5

THREE DIMENSIONAL BALANCE ASSEMBLY

CROSS REFERENCE TO RELATED CASES

This application is related to and claims the benefit of the filing date of U.S. Provisional Application No. 60/608,819 filed on Sep. 10, 2004, entitled GENERALIZED INERTIAL MEASUREMENT ERROR REDUCTION THROUGH MULTIPLE AXIS ROTATION DURING FLIGHT, which is incorporated herein by reference.

This application is also related to the following applications filed on even date herewith, all of which are hereby incorporated herein by reference:

U.S. patent application Ser. No. 11/004,517 (pending), entitled "GENERALIZED INERTIAL MEASUREMENT ERROR REDUCTION THROUGH MULTIPLE AXIS ROTATION DURING FLIGHT," (the '6368 Application);

U.S. patent application Ser. No. 11/004,184 (pending), entitled "GAS SUPPORTED INERTIAL SENSOR SYSTEM AND METHOD," (the '6540 Application);

U.S. patent application Ser. No. 11/004,214 (issued), entitled "GAS JET CONTROL FOR INERTIAL MEASUREMENT UNIT," (the '6535 Application);

U.S. patent application Ser. No. 11/004,452 (pending), entitled "ARTICULATED GAS BEARING SUPPORT PADS," (the '6475 Application);

U.S. patent application Ser. No. 11/004,531 (pending), entitled "SPHERICAL POSITION MONITORING SYSTEM," (the '7169 Application);

U.S. patent application Ser. No. 11/004,759 (allowed), entitled "ABSOLUTE POSITION DETERMINATION OF AN OBJECT USING PATTERN RECOGNITION," (the '7167 Application);

U.S. patent application Ser. No. 11/004,743 (pending), entitled "PRECISE, NO-CONTACT, POSITION SENSING USING IMAGING," (the '7057 Application);

U.S. patent application Ser. No. 11/004,177 (pending), entitled "RF WIRELESS COMMUNICATION FOR DEEPLY EMBEDDED AEROSPACE SYSTEMS," (the '6345 Application).

TECHNICAL FIELD

This invention relates generally to an adjustable balance assembly and in particular, it relates to a sensor assembly balance system which is composed of two or more sections connected by a shaft containing eccentric weights.

BACKGROUND OF THE INVENTION

Inertial navigation systems (INS) are used in civil and military aviation, missiles and other projectiles, submarines and space technology as well as a number of other vehicles. An INS measures the position and attitude of a vehicle by measuring the accelerations and rotations applied to the system's inertial frame. INSs are widely used because it refers to no real-world item beyond itself. It is therefore resistant to jamming and deception.

An INS may consist of an inertial navigation system combined with control mechanisms, allowing the path of a vehicle to be controlled according to the position determined by the inertial navigation system. A typical INS uses a combination of accelerometers and any number of control devices.

Inertial navigation systems have typically used either gyrostabilized platforms or 'strapdown' systems. The gyrostabilized system allows a vehicle's roll, pitch and yaw angles to be measured directly at the bearings of gimbals. The big disadvantage of this scheme is that it employs multiple expensive precision mechanical parts. It also has moving parts that can wear out or jam, and is vulnerable to gimbal lock. In addition, for each degree of freedom another gimbal is required thus increasing the size and complexity of the INS. Strapdown systems work well in some applications. One key difference is the ability of a rotating sensor assembly in a gyrostablized system to self calibrate periodically and thus maintain higher accuracy over a longer period of time.

Another type of inertial navigation system is one that floats a sensor assembly with neutral buoyancy in a fluid. This method requires an extremely complex assembly, sensitive temperature control and obvious sealing challenges that add considerably to the cost of deployment and maintenance. Also, many of these fluids are hazardous or require a high degree of purity.

For high accuracy applications, INSs mounted within vehicles require regular calibration. As a result there is a need for easy access to sensor and control mechanisms for adjustment.

For the reasons stated above and for other reasons stated below which will become apparent to those skilled in the art upon reading and understanding the present specification, there is a need in the art for a guidance system which is inexpensive and easy to access for adjustment mostly in the initial build phase and for rebalancing a system during a scheduled maintenance.

SUMMARY OF THE INVENTION

The above-mentioned drawbacks associated with existing inertial navigation systems are addressed by embodiments of the present invention and will be understood by reading and studying the following specification.

In one embodiment, a three-dimensional balance assembly is provided. The three-dimensional balance assembly comprises a center shaft with two or more eccentric weighted shafts encompassing the center shaft. Each eccentric weighted shaft includes at least one eccentric weight and each eccentric weighted shaft is independently rotatable around the center shaft to provide balance to the assembly in two dimensions. This independent rotation also allows the magnitude of the balance to be adjusted simultaneously with the direction or location of balance. The three-dimensional balance assembly also comprises a first and a second locking mechanism that lock each weighted shaft into any rotational location. The center shaft has a first and a second bore extending inwardly from each end of the center shaft and the first and second bore are adapted to receive and secure one or more axial weights and balance the assembly in a third dimension.

In another embodiment, a spherical sensor apparatus is provided. The spherical sensor apparatus comprises a first and a second hemisphere and a main shaft extending from the first hemisphere to the second hemisphere. The main shaft connects the first and second hemispheres to form a sphere. The main shaft includes a first and a second bore extending inwardly from each end of the main shaft. A plurality of eccentric weighted shafts encompass the main shaft and each eccentric weighted shaft includes at least one eccentric weight. Each eccentric weighted shaft is independently rotatable around the main shaft to balance the spherical sensor in two dimensions. There are at least two axial balance weights within the first and second bores of the main shaft that are movable within the first and second bores to provide a third degree of balance of the spherical sensor. The sphere has at least one opening to allow for the adjustment of the plurality of eccentric weighted shafts and the at least two axial balance weights without disassembly of the sphere.

In another embodiment, a method of three dimensional balancing of a sensor assembly is provided. The method of three dimensional balancing of a sensor assembly comprises rotating two or more eccentric weighted shafts around a center shaft so that the sensor assembly is balanced in two dimensions. The next step is locking the two or more eccentric weighted shafts in any rotational location and adjusting one or more axial balance weights located inside the center shaft to provide axial balance of the sensor assembly in a third dimension. The sensor assembly is three dimensionally balanced without disassembling the sensor assembly. The balance is accomplished without the need to add or remove piece parts to the assembly, thus maintaining a single configuration.

BRIEF DESCRIPTION OF THE DRAWINGS

Features and advantages of the present invention will become apparent to those skilled in the art from the following description with reference to the drawings, in which:

FIG. 3 is an illustration of a cut away side view of one embodiment of a spherical sensor block.

FIG. 4a is an illustration of a front view of one embodiment of a spherical sensor block.

FIG. 5 is an illustration of a block diagram of one embodiment of an electronically controlled balance assembly.

DETAILED DESCRIPTION

Figure 1A:
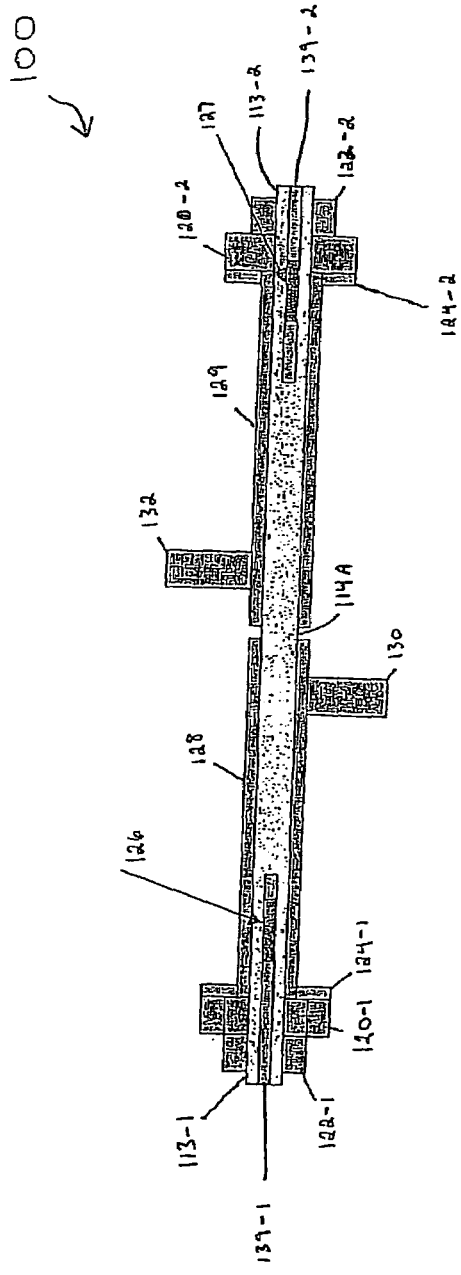
FIG. 1A is an illustration of a front view of one embodiment of a balancing assembly.

In the following detailed description, reference is made to the accompanying drawings that form a part hereof, and in which is shown by way of illustrating specific embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Embodiments of the present invention provide a balancing assembly suitable for use in, with, or as an inertial navigation system where the assembly is adapted to be balanced in three dimensions. This is important in applications requiring the launch of an object such as a plane or a missile where high G loading will be generated. Due to high G loading during launch small imbalances in the sensor block produces large torques. The large torques must be overcome by an attitude control system. The magnitudes of G loading, weight of the balance assembly or sensor block that the balance assembly is mounted in, and torque capability of the attitude control system, dictate very precise balance.

Embodiments of the present invention provide a three dimensionally balanced assembly having a main shaft that is encompassed by two or more eccentric balance shafts that are able to be rotated relative to each other to adjust the magnitude of CG offset in the radial direction. The two eccentric balance shafts are lockable in place at desired positions and enable balancing of the assembly in two degrees. Each of the two eccentric balance shafts has weights fixed to them that produce the actual CG offset when a CG offset is desired. The addition of individual axial balance weights along the main shaft allows adjustment along the axial direction of the balance assembly and provides the third degree of balance and thus giving three dimensional balancing.

In another embodiment, the main shaft contains a plurality of axial balance weights wherein each weight is adjusted and moved along the central shaft so that one degree of balancing is provided. The plurality of axial balance weights are locked into place once the desired position is achieved.

In one embodiment, the sensor block is floated in a near frictionless environment to allow motion in all directions prior to moving or while in motion. This eliminates the need for gimbals and ball bearings, thereby reducing the complexity, size, and cost of the inertial navigation system. The floated sensor assembly can be operated in strap down, one degree of freedom, two degrees of freedom, or three degrees of freedom rotation with no change in size, weight, or complexity.

In another embodiment, the sensor block is in the shape of a sphere. The sphere is composed of a first section and a second section. The first section and the second section are substantially equal in size. First and second section sizes that are not equal in size are contemplated and are within the scope of this invention. Other shapes for the sensor block are contemplated and are within the scope of the invention, these include cubes, pyramids, cylinders, and other polygons known by those skilled in the art. The first and second section are held together by a central shaft to form the sphere.

In another embodiment, the sensor block assembly is floated in a near frictionless environment to allow motion in all directions prior to and during launch. This is done using the invention described in the '6540 application referenced and incorporated herein. The present invention allows three axes of balance adjustment of the sensor assembly without disassembly and without adding or removing piece parts, i.e. balance weights. (This maintains a single configuration of the assembly). The minimized intrusion of the assembly surface is accomplished since all adjustments are made through two holes on substantially opposite ends of the assembly that correspond with the position of the central shaft. The central shaft supports the two eccentric weighted shafts and provides a tensile load to keep the two sections of the sensor block together. The two eccentric weighted shafts are locked externally to the sphere by a serrated washer and lock nut.

Embodiments of the present invention provide very precise balance, on the order of 0.010 inch center of gravity (CG) offset.

FIG. 1A is an illustration of one embodiment of an adjustable balance assembly 100. Embodiments of assembly 100 are suitable for use in, with, or as an inertial navigation system. In the embodiment shown in FIG. 1A, assembly 100 includes a central shaft 114A encompassed by first and second eccentric weighted shafts 128 and 129. First eccentric weighted shaft 128 and second eccentric weighted shaft 129.

In one embodiment, each eccentric weighted shafts 128 and 129 includes one or more eccentric weights 130, 132. In one embodiment, eccentric weights 130 and 132 are integral with respective weighted shafts 128 and 129. Eccentric weights 130 and 132 are formed to be heavier at the farthest point from shafts 128 and 129. In one embodiment, eccentric weights 130 and 132 are formed with a slug of higher density of material at the end of the moment.

In one embodiment, weighted shafts 128 and 129 rotate independently around a central shaft 114A. Each weighted shaft 128 and 129 is lockable in place. In one embodiment, balance assembly 100 includes locking mechanisms to lock each weighted shafts 128 and 129 into any rotational location. In one embodiment, a locking mechanism includes a rotary lock washer 124 and a locking nut 120. In one embodiment, lock washer 124 is a serrated washer or the like. In this embodiment, first weighted shaft 128 includes first rotary lock washer 124-1 and first locking nut 120-1 and second weighted shaft 129 includes second rotary lock washer 124-2 and second locking nut 120-2. In this embodiment, central shaft 114A includes exterior threads on both ends of shaft 114A that are adapted to receive locking nuts 120. In combination, lock washer 124 and locking nut 120 lock eccentric weighted shafts 128 and 129 in position. In one embodiment, lock washer 124 has grooves, so when lock nut 120 is tight washer 124 locks into a groove and keeps lock nut 120 from rotating.

In one embodiment, balance assembly 100 further includes retaining nuts 122. Retaining nuts 122-1 and 122-2 are each threaded onto opposing threaded ends 113-1 and 113-2 of central shaft 114A and when secured provide tension along central shaft 114A. As will be discussed with other embodiments below, retaining nuts 122 aid in securing portions of sensor assemblies together.

In one embodiment, central shaft 114A includes a first and a second bore 139-1 and 139-2 within central shaft 114A. Each bore 139 is adapted to receive one or more balance weights 126 and 127. Balance weights 126 and 127 are moveable within first and second bores 139-1 and 139-2, respectively.

In one embodiment, first and second bores 139-1 and 139-2 are threaded and balance weights 126 and 127 are correspondingly threaded and are adapted to be threaded along respective bores 139 using a tool such as a screwdriver or other method known by those skilled in the art.

In another embodiment, balance weights 126 and 127 are held in bores 139-1 and 139-2 using pressure. In one embodiment, central shaft 114A is made of a resilient material that allows balance weights 126 and 127 to be held firmly in place and be movable along the length of bores 139.

In another embodiment, bores 139 of central shaft 114A and balance weights 126 and 127 have a magnetic relationship that allows balance weights 126 and 127 to be moved along the length of respective bores 126 and 127 and held in place magnetically.

In one embodiment, magnets are used to move balance weights 126 and 127 along the length of respective bores 126 and 127.

It is understood that central shaft 114A and weights internal or external to central shaft (such as balance weights 126 and 127 described above) are formed of any material such that the weights are movable along central shaft 114A and securable in location to allow adjustment along the axial direction of balance assembly 100, a sensor assembly, an inertial navigation system, or the like that central shaft 114A is mounted in or on. The described eccentric weights and balance weights are accessible and adjustable with ease and without disassembly of balance assembly 100.

In operation eccentric weighted shafts 128 and 129 are rotated independently of each other and then locked into any given rotary position to adjust both the direction and the magnitude of the center of gravity (CG) offset in plane with the center point of central shaft 114A. First eccentric weighted shaft 128 and second eccentric weighted shaft 129 are rotated about central shaft 114A and first eccentric weight 130 and second eccentric weight 132 adjust the magnitude of CG offset in the radial direction. The CG offset can be increased in magnitude by rotating the two eccentric weights 130 and 132 with respect to each other or changing the angular position of the CG offset by rotating both eccentric shafts 128 and 129 together. The CG offset is further discussed with respect to the illustrations in FIGS. 2A-2D below. A third axis of balance is provided by balance weights 126 and 127 that are moved along respective central shaft 114A within respective bores 139-1 and 139-2.

In an alternate embodiment, balance assembly 100 includes a central shaft 114A that is encompassed by more than two eccentric shafts rotatable relative to each other to adjust the magnitude of CG offset of the balance assembly in the radial direction. The plurality of eccentric shafts each have eccentric weights such as eccentric weights 130 and 132 fixed to them that produces desired CG offsets. Each of the eccentric shafts is lockable into desired positions and provides balancing in two dimensions.

Use of automation to rotate the eccentric weights and move the axial balance weights are contemplated within the scope of the invention. In one embodiment electronic signals are sent to the sensor assembly that control the movement of the eccentric weights and the axial weights by activating motors contained within the assembly. Automation or electronically controlled systems are preferred for in flight designs. This is further described with respect to FIG. 5 below.

In another embodiment, the eccentric shafts and axial balance weights are electronically controlled and are continuously adjusted so that the sensor assembly is in a constant spin.

Figure 1B:
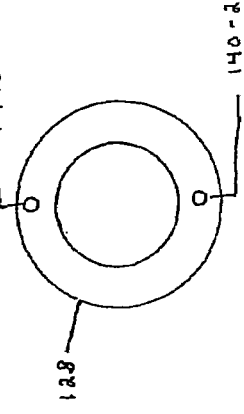
FIG. 1B is an illustration of an exterior end view of one embodiment of an eccentric weighted shaft.

FIG. 1B is an illustration of one embodiment of an exterior end of an eccentric weighted shaft 128 as described above with respect to FIG. 1. As shown shaft 128 includes 2 opposing holes 140-1 and 140-2 that are adapted to receive portions of a tool such as prongs of a spanner wrench. Once retaining nut 122-1 and locking nut 120-1 are removed, access to eccentric weighted shaft 128 is permitted and holes 140-1 and 140-2 are accessible for manual rotation of shaft 128 into a desired position. This would be similarly true for eccentric weighted shaft 129, retaining nut 122-2 and locking nut 120-1. In one embodiment, the adjustment of eccentric weighted shafts 128 and 129 into a specific location is performed by rotating shafts 128 and 129 using a tool such as a spanner wrench that is inserted into holes 140 on the ends of shafts 128 and 129. It is understood that other tools and means of rotating eccentric weighted shafts 128 and 129 are possible.

In operation, first eccentric weighted shaft 128 with respective first eccentric weight 130 and second eccentric weighted shaft 129 with respective second eccentric weight 132 are rotated to provide two degrees of balance. In one embodiment, when the desired position is achieved, first rotary lock washer 124-1 with grooves (not shown) fits over the first eccentric weighted shaft 128 and keeps it from rotating by locking into a groove (not shown) when first locking nut 120-1 is tight. A similar procedure is used with respect to second eccentric weighted shaft 129. To provide the third degree of balance, threaded balance weight 126 and second balance weight 127 are adjusted to the appropriate positions by moving the weights 126, 127 along respective bores 139-1 and 139-2 of center shaft 114A.

Figure 1C:
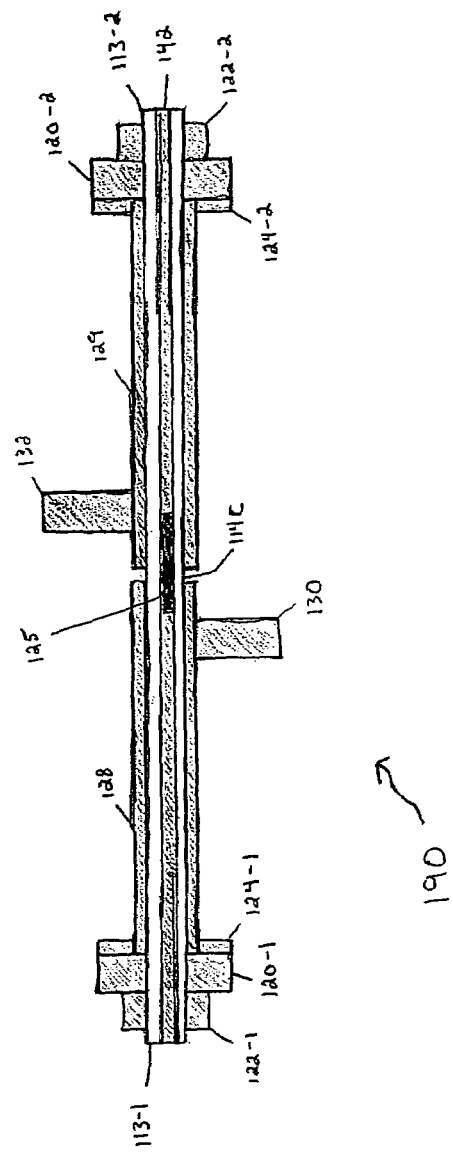
FIG. 1C is an illustration of another embodiment of a balancing assembly.

FIG. 1C is an illustration of another embodiment of an adjustable balance assembly shown generally at 190. Balance assembly 190 is similar to balance assembly 100 of FIG. 1A above. Similar components are labeled using the same reference numbers. In contrast, balance assembly 190 includes a central shaft 114C that having a bore 142 that runs the length of central shaft 114C. Bore 142 is adapted to receive a balance weight 125. Balance weight 125 is moveable within bore 142.

In one embodiment, bore 142 is threaded and balance weight 125 is correspondingly threaded. In one embodiment, balance weight 125 is adapted to be threaded along bore 142 using a tool such as a screwdriver or other method known by those skilled in the art.

In another embodiment, balance weight 125 is held in bore 142 using pressure. In one embodiment, central shaft 114C is made of a resilient material that allows balance weight 125 to be held firmly in place and be movable along the length of bore 142.

In another embodiment, bore 142 of central shaft 114C and balance weight 125 have a magnetic relationship that allows balance weight 125 to be moved along the length of bore 142 and held in place magnetically.

In one embodiment, magnets are used to move balance weight 125 along the length of bore 142.

In operation, FIG. 1C functions like that of FIG. 1A except that the third degree of balance is accomplished by moving balance weight 125 along bore 142C.

Figure 2A:
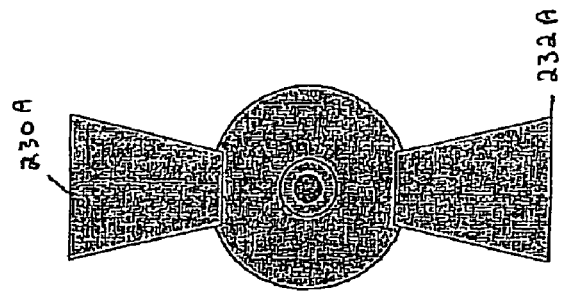
FIG. 2a is an illustration of a weight position of one embodiment that results in a zero center of gravity offset.

FIG. 2A is one embodiment of an illustration of radial balance adjustment for an adjustable balance assembly suitable for use in, with, or as an inertial navigation system such as adjustable balance assembly 100 of FIG. 1A and balance assembly 190 of FIG. 1C above. FIG. 2A illustrates eccentric weights 230A and 232A similar to eccentric weights 130 and 132 discussed with respect to FIG. 1A above. Weights 230A and 232A are each coupled to respective eccentric weighted shafts (not visible) such as eccentric weighted shafts 128 and 129 of FIG. 1A above. In the illustrated orientation, eccentric weights 230A and 232A oppose each other and are balanced to result in zero center of gravity offset for an adjustable balance assembly such as 100 of FIG. 1A and balance assembly 190 of FIG. 1C above. In this embodiment, the weights balance themselves out causing the center of gravity to be at the center of the assembly.

Figure 2B:
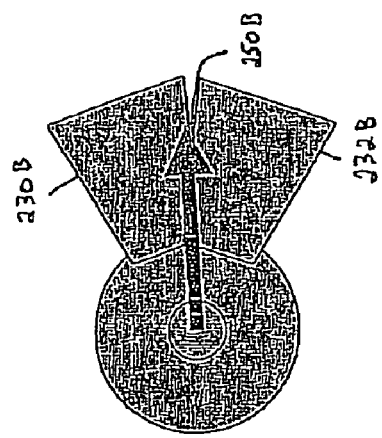
FIG. 2b is an illustration of a weight position of one embodiment that results in maximum center of gravity offset.

FIG. 2B is one embodiment of an illustration of radial balance adjustment for an adjustable balance assembly suitable for use in, with, or as an inertial navigation system such as adjustable balance assembly 100 of FIG. 1A and balance assembly 190 of FIG. 1C above. FIG. 2B illustrates eccentric weights 230B and 232B similar to eccentric weights 130 and 132 discussed with respect to FIG. 1A above. Weights 230B and 232B are each coupled to respective eccentric weighted shafts (not visible) such as eccentric weighted shafts 128 and 129 of FIG. 1A and balance assembly 190 of FIG. 1C above. In the illustrated orientation, eccentric weights 230B and 232B are aligned to provide near maximum CG offset, shown by arrow 250B, for an adjustable balance assembly such as 100 of FIG. 1A and balance assembly 190 of FIG. 1C above. In this embodiment, the weights 230B and 232B cause a near maximum center of gravity offset in the direction of arrow 250B.

Figure 2C:
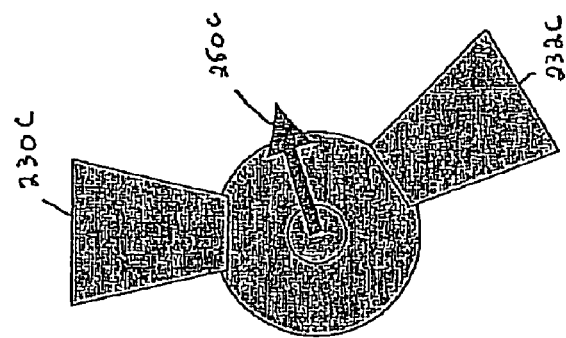
FIG. 2c is an illustration of a weight position of one embodiment that results in an intermediate center of gravity offset.

FIG. 2C is one embodiment of an illustration of radial balance adjustment for an adjustable balance assembly suitable for use in, with, or as an inertial navigation system such as adjustable balance assembly 100 of FIG. 1A and balance assembly 190 of FIG. 1C above. FIG. 2C illustrates eccentric weights 230C and 232C similar to eccentric weights 130 and 132 discussed with respect to FIG. 1A above. Weights 230C and 232C are each coupled to respective eccentric weighted shafts (not visible) such as eccentric weighted shafts 128 and 129 of FIG. 1A and FIG. 1C above. In the illustrated orientation, eccentric weights 230C and 232C are aligned to provide an intermediate CG offset, shown by arrow 250C, for an adjustable balance assembly such as 100 of FIG. 1A and balance assembly 190 of FIG. 1C above. In this embodiment, weights 230C and 232C cause a near maximum center of gravity offset in the direction of arrow 250C.

Figure 2D:
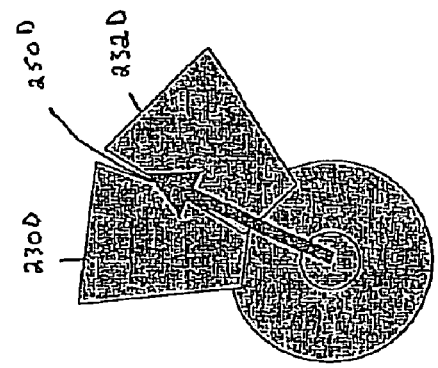
FIG. 2d is an illustration of a weight position of one embodiment that results in a maximum center of gravity offset at a different rotary position.

FIG. 2D is one embodiment of an illustration of radial balance adjustment for an adjustable balance assembly suitable for use in, with, or as an inertial navigation system such as adjustable balance assembly 100 of FIG. 1A and balance assembly 190 of FIG. 1C above. FIG. 2D illustrates asset of eccentric weights 230D and 232D similar to eccentric weights 130 and 132 discussed with respect to FIG. 1A above. Weights 230D and 232D are each coupled to respective eccentric weighted shafts (not visible) such as eccentric weighted shafts 128 and 129 of FIG. 1A and balance assembly 190 of FIG. 1C above. In the illustrated orientation, eccentric weights 230D and 232D are aligned to provide near maximum CG offset, shown by arrow 250D, for an adjustable balance assembly such as 100 of FIG. 1A and balance assembly 190 of FIG. 1C above. In this embodiment, the weights 230D and 232D cause a near maximum center of gravity offset in the direction of arrow 250D.

FIG. 3 illustrates a cut away side view of one embodiment of a spherical sensor block 300. In this embodiment, spherical sensor block 300 is comprised of two similarly sized and shaped hemispheres 301 and 303. In other embodiment, spherical sensor block 300 is comprised of two or more portions that form the spherical sensor block 300.

Spherical sensor block 300 includes an adjustable balance assembly 375 such as adjustable balance assembly 100 discussed above with respect to FIG. 1A. In an alternate embodiment sensor block 300 includes an adjustable balance assembly 375 such as adjustable balance assembly 190 as described with respect to FIG. 1C. Adjustable balance assembly 375 includes a center shaft 314 that is encompassed by two or more eccentric balance shafts 328 and 329 that are independently rotatable relative to each other to adjust the magnitude of CG offset of spherical sensor block 300 in the radial direction. Eccentric balance shafts 328 and 329 are lockable in place at desired positions and enable balancing of spherical sensor block 300 in two degrees. Each of the two eccentric balance shafts 328 and 329 has weights 330 and 332, respectively, fixed to them that produce the actual CG offset when a CG offset is desired. In one embodiment, eccentric balance shafts 328 and 329 and respective weights 330 and 332 are as described with respect to eccentric balance shafts 128 and 129 and respective weights 130 and 132 of FIG. 1A above.

In one embodiment, balance assembly 375 includes locking mechanisms to lock each weighted shaft 328 and 329 into any rotational location. In one embodiment, a locking mechanism includes a rotary lock washer 324 and a locking nut 320. In one embodiment, lock washer 324 is a serrated washer or the like. In this embodiment, first weighted shaft 328 includes first rotary lock washer 324-1 and first locking nut 320-1 and second weighted shaft 329 includes second rotary lock washer 324-2 and second locking nut 320-2. In one embodiment, central shaft 314 includes exterior threads on both ends of shaft 314 that are adapted to receive locking nuts 320. In combination, lock washer 324 and locking nut 320 lock eccentric weighted shafts 328 and 329 in position. In one embodiment, lock washer 324 has grooves, so when lock nut 320 is tight washer 324 locks into grooves in 301 and 303 while at the same time catching flats or other features on the shaft of 328 and 329 thereby keeping the shaft from rotating relative to the sphere.

In one embodiment, balance assembly 375 further includes retaining nuts 322. Retaining nuts 322-1 and 322-2 are each threaded onto opposing threaded ends 313-1 and 313-2 of central shaft 314 and when secured provide tension along central shaft 314 to precisely hold hemispheres 301 and 303 together to form a sphere.

In one embodiment, central shaft 314 includes a first and a second bore 339-1 and 339-2 within central shaft 314. Each bore 339 is adapted to receive one or more balance weights 326 and 327. Balance weights 326 and 327 are moveable and securable within first and second bores 339-1 and 339-2, respectively. In one embodiment, bores 339-1 and 339-2 and balance weights 326 and 327 are as described with respect to bores 139-1 and 139-2 and balance weights 126 and 127 of FIG. 1A above. In an alternate embodiment, central shaft 314 is as described in FIG. 1C. The addition of individual axial balance weights 326 and 327 along central shaft 314 allows adjustment along the axial direction of spherical sensor block 300 and provides the third degree of balance and thus enabling three dimensional balancing.

Retaining nuts 322 and locking nuts 320 are accessible from the exterior of spherical sensor block 300 via two openings 334-1 and 334-2 located on opposing sides of spherical sensor block 300. In one embodiment, when locking nut 320-1 is loosened weighted shaft 328 is accessible for adjustment and similarly when locking nut 320-2 is loosened weighted shaft 329 is accessible for adjustment. In one embodiment, the adjustment of balance weights 326 and 327 is available via openings 334-1 and 334-2. Three dimensional balancing of spherical sensor block 300 is available without disassembly. As a result, the ability to adjust the balance of spherical sensor block 300 while maintaining the sphericity of the outer surface is accomplished with minimum holes or intrusions into the outer surface that result in minimal opening and closing of the sensor block 300 for adjustment of balance.

In operation, first eccentric weighted shaft 328 and second eccentric weighted shaft 329 are rotated around central shaft 314 to provide two degrees of balance as their respective eccentric weights 330, 332 are positioned so that they cancel each other out producing a zero center of gravity offset or instead positioned so that they do not cancel each other out and provide a center of gravity offset. Examples of CG offset, by positioning of eccentric weights, are described with respect to FIGS. 2A-2D above.

FIG. 4a illustrates a front view of one embodiment of a spherical sensor block shown generally at 400. As seen in this figure, spherical sensor block 400 is composed of a left hemisphere 401 and a right hemisphere 403. In this embodiment, left hemisphere 401 and right hemisphere 403 are substantially similar in size and substantially spherical in shape. In alternate embodiments, spherical sensor block 400 includes two pieces that are substantially different in size. In alternate embodiments, spherical sensor block 400 is not spherical in shape.

Spherical sensor block 400 includes one or more sensors 402-1 to 402-N mounted within the two hemispheres 401 and 403. Spherical sensor block 400 further includes central shaft 414 fastened in left hemisphere 401 and extending outwardly from the interior of left hemisphere 401 with a threaded end portion 415. In one embodiment, central shaft 414 is as described with respect to central shaft 114 of FIG. 1A and central shaft 314 of FIG. 3 above. In an alternate embodiment, central shaft 414 is as described with respect to central shaft 114C of FIG. 1C. Threaded end portion 415 is adapted to be received by bore 407 of right hemisphere 403 and once threaded into bore 407 extends to the exterior of right hemisphere 403. Spherical sensor block 400 further includes a divider disk 416 coupled to both the left and right hemispheres 401 and 403. Divider disk is described below in more detail with respect to FIG. 4b.

Figure 4B:
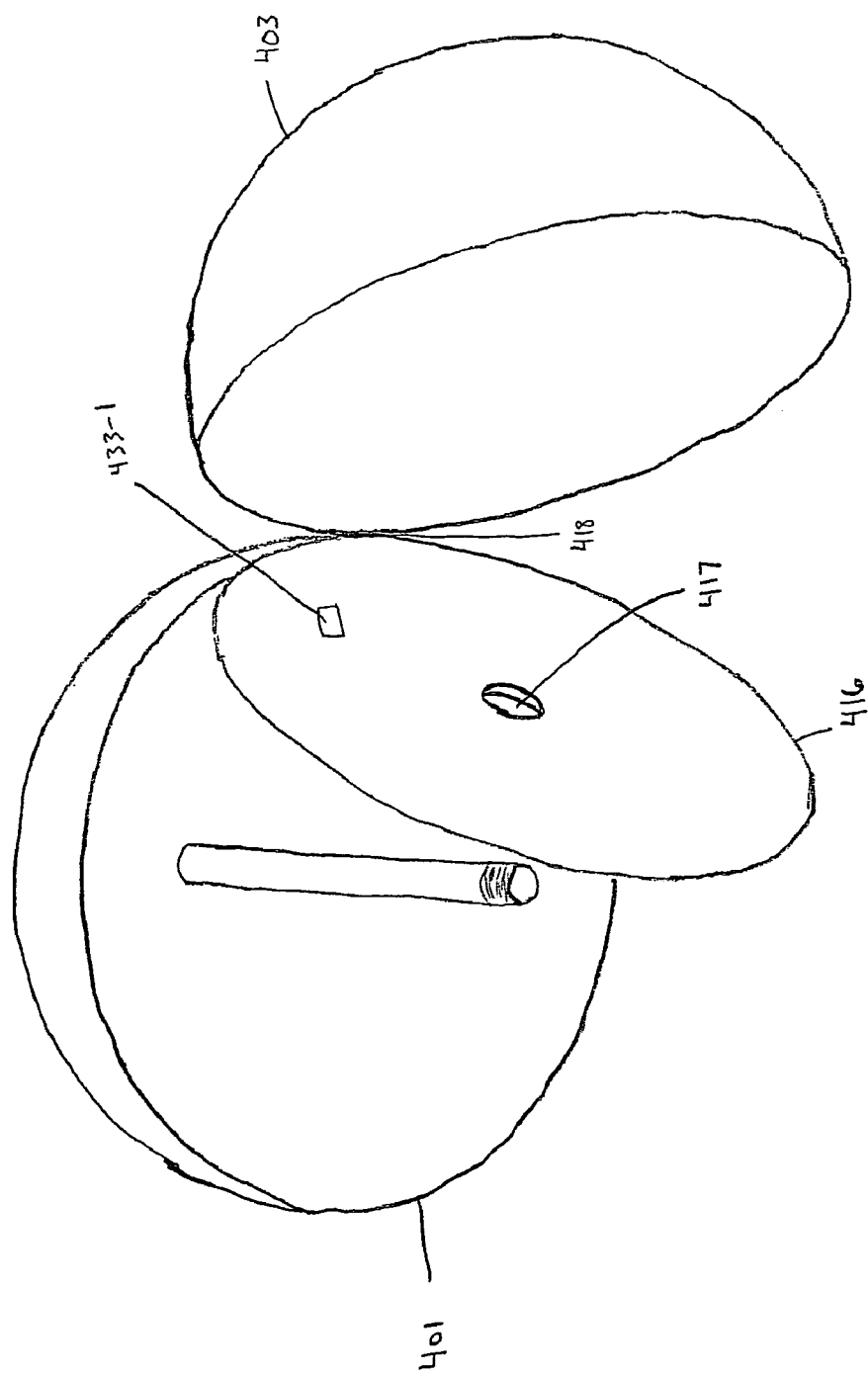
FIG. 4b is an illustration of a top view of one embodiment of a spherical sensor block.

FIG. 4b illustrates a top view of one embodiment of spherical sensor block 400 of FIG. 4a above. Divider disk 416 is shown and contains one or more electronic components 433-1. In alternate embodiments, divider disk 416 contains no electronic components. In one embodiment, divider disk 416 includes an opening 417 adapted to allow central shaft 414 to pass through.

FIG. 5 illustrates a block diagram of one embodiment of an electronically controlled balance assembly system shown generally at 500. Balance assembly system 500 includes a balance assembly 591 that wirelessly communicates with control unit 590. Embodiments of balance assembly 591 are suitable for use in, with, or as an inertial navigation system. In one embodiment, balance assembly 591 is as described above with respect to balance assembly 100 of FIG. 1A. In an alternate embodiment, balance assembly 591 is as described in FIG. 1C. In this embodiment, balance assembly 591 is adjustable electronically using wireless communications as described in related application entitled "RF WIRELESS COMMUNICATION FOR DEEPLY EMBEDDED AEROSPACE SYSTEMS" Ser. No. 11/004,177 filed even date herewith and incorporated herein.

In this embodiment, control unit 590 sends and receives electronic signals to/from transceiver unit 594 incorporated within balance assembly 591. Transceiver 594 is coupled to one or more servos or actuators that control balance assembly 591 to provide three dimensional balancing of balance assembly 591. Servos and/or actuators 596 are employed to move individual components of the balance assembly 591 to provide three dimensional balancing. In addition, in one embodiment servos and/or actuators 596 are employed to lock the individual components in place. In one embodiment, the components include eccentric weighted shafts, eccentric weights, balance weights or the like as described above with respect to FIGS. 1A-1C, 2A-2D, 3, 4A, and 4B.

In one embodiment, control unit 590 provides signals to balance assembly 591 to rotate the assembly in one or more directions to calibrate balance assembly 591. Balance assembly 591 includes one or more sensors 502 such as accelerometers, thermometers, pressure devices or the like. Sensors 502 provide information about balance assembly 591 to aid in adjusting weights, shafts or other devices of balance assembly 591. In one embodiment, sensors 502 provide information about the attitude of the balance assembly with respect to its surroundings and the information is used to adjust the center of gravity of balance assembly 591.

In one embodiment, control unit 590 is integral to balance assembly 591. In another embodiment, control unit 590 is located remotely to the system or device that balance assembly 591 is mounted in or on.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations. Therefore, it is manifestly intended that this invention be limited only by the claims and the equivalents thereof.

What is claimed is:

1. A three-dimensional balance assembly, comprising:
a center shaft;
two or more eccentric weighted shafts encompassing the center shaft; and
wherein each eccentric weighted shaft includes at least one eccentric weight;
wherein the two or more eccentric weighted shafts are independently rotatable around the center shaft to balance the assembly in two dimensions;
a first and a second locking mechanism that lock each weighted shaft into any rotational location;
wherein the center shaft includes a first and a second bore extending inwardly from each end of the center shaft;
wherein the first and second bores are adapted to receive and secure one or more axial weights and balance the assembly in a third dimension.

2. The assembly of claim 1, wherein the two or more eccentric weighted shafts are manually adjustable.

3. The assembly of claim 1, wherein the two or more eccentric weighted shafts are adjusted electronically.

4. The assembly of claim 1, wherein the one or more axial weights are manually adjustable.

5. The assembly of claim 1, wherein the one or more axial weights are adjusted electronically.

6. The assembly of claim 1, wherein the one or more axial weights are threaded and the first and second bores are each threaded and the axial weights are adjusted by threading them along the first and second bores, respectively.

7. The assembly of claim 1, wherein the one or more axial weights are secured in place using pressure.

8. The assembly of claim 1, wherein the one or more axial weights have a magnetic relationship with the central shaft that allows the one or more axial weights to be moved along a length of the first and second bores and held in place magnetically.

9. The assembly of claim 1, wherein the at least one eccentric weight is positioned to cause an offset in a center of gravity of the balance assembly.

10. The assembly of claim 1, wherein the at least one eccentric weight is positioned to cause zero center of gravity offset of the balance assembly.

11. The assembly of claim 1, wherein the at least one eccentric weight is formed to be heavier at the farthest point from the two or more eccentric weighted shafts.

12. An inertial navigation system, comprising:
a three-dimensional balance assembly including:
a center shaft;
two or more eccentric weighted shafts encompassing the center shaft; and
wherein each eccentric weighted shaft includes at least one eccentric weight;
wherein the two or more eccentric weighted shafts are independently rotatable around the center shaft to balance the inertial navigation system in two dimensions;
a first and a second locking mechanism that lock each weighted shaft into any rotational location;
wherein the center shaft includes a first and a second bore extending inwardly from each end of the center shaft;
wherein the first and second bores are adapted to receive and secure one or more axial weights and balance the inertial navigation system in a third dimension.

13. The system of claim 12, wherein the two or more eccentric weighted shafts are manually adjustable.

14. The system of claim 12, wherein the two or more eccentric weighted shafts are adjusted electronically.

15. The system of claim 12, wherein the one or more axial weights are manually adjustable.

16. The system of claim 12, wherein the one or more axial weights are adjusted electronically.

17. The system of claim 12, wherein the one or more axial weights are threaded and the first and second bores are each threaded and the axial weights are adjusted by threading them along the first and second bores, respectively.

18. The system of claim 12, wherein the one or more axial weights are secured in place using pressure.

19. The system of claim 12, wherein the one or more axial weights have a magnetic relationship with the central shaft that allows the one or more axial weights to be moved along a length of the first and second bores and held in place magnetically.

20. The system of claim 12, wherein the at least one eccentric weight is positioned to cause an offset in a center of gravity of the inertial navigation system.

21. The system of claim 12, wherein the at least one eccentric weight is positioned to cause zero center of gravity offset of the inertial navigation system.

22. The system of claim 12, wherein the at least one eccentric weight is formed to be heavier at the farthest point from the two or more eccentric weighted shafts.

23. A sensor assembly apparatus comprising:
a first section;
a second section;
a central shaft that connects the first section and the second section and is enclosed within the first section and the second section forming a completed shape;
wherein the center shaft includes a first and a second bore extending inwardly from each end of the center shaft;
at least two eccentric weighted shafts that encompass the central shaft and are rotatable around the central shaft to provide two degrees of balance of the sensor assembly and are adjustable to any rotational location without disassembly of the sensor assembly;
wherein each eccentric weighted shaft includes at least one eccentric weight; and
at least two axial balance weights within the first and second bores of the central shaft that are movable within the first and second bores to provide a third degree of balance and are adjustable without disassembly of the sensor assembly.

24. The apparatus of claim 23, wherein the at least two eccentric weighted shafts are manually adjustable.

25. The apparatus of claim 23, wherein the at least two eccentric weighted shafts are adjusted electronically.

26. The apparatus of claim 23, wherein the at least two axial weights are manually adjustable.

27. The apparatus of claim 23, wherein the at least two axial weights are adjusted electronically.

28. The apparatus of claim 23, wherein the at least two axial weights are threaded and the first and second bores are each threaded and the axial weights are adjusted by threading them along the first and second bores, respectively.

29. The apparatus of claim 23, wherein the at least two axial weights are secured in place using pressure.

30. The apparatus of claim 23, wherein the at least two axial weights have a magnetic relationship with the central shaft that allows the one or more axial weights to be moved along a length of the first and second bores and held in place magnetically.

31. The apparatus of claim 23, wherein the at least one eccentric weight is positioned to cause an offset in a center of gravity of the sensor assembly.

32. The apparatus of claim 23, wherein the at least one eccentric weight is positioned to cause zero center of gravity offset of the sensor assembly.

33. The apparatus of claim 23, wherein the at least one eccentric weight is formed to be heavier at the farthest point from the at least two eccentric weighted shafts.

34. The apparatus of claim 23, wherein the completed shape has at least one opening allowing adjustments to the at least two eccentric weighted shafts and the at least two axial weights without disassembly of the completed shape.

35. The apparatus of claim 23, further comprising:
a plurality of sensors located within the completed shape.

36. A spherical sensor apparatus comprising:
a first hemisphere;
a second hemisphere;
a main shaft extending from the first hemisphere to the second hemisphere and connecting the first and second hemispheres to form a sphere;
wherein the main shaft includes a first and a second bore extending inwardly from each end of the main shaft;
a plurality of eccentric weighted shafts encompassing the main shaft;
wherein each eccentric weighted shaft includes at least one eccentric weight; and
wherein each eccentric weighted shaft is independently rotatable around the main shaft to balance the spherical sensor in two dimensions;
at least two axial balance weights within the first and second bores of the main shaft that are movable within the first and second bores to provide a third degree of balance of the spherical sensor; and
at least one opening in the sphere to allow for the adjustment of the plurality of eccentric weighted shafts and the at least two axial balance weights without disassembly of the sphere.

37. The apparatus of claim 36, wherein the plurality of eccentric weighted shafts are manually adjustable.

38. The apparatus of claim 36, wherein the plurality of eccentric weighted shafts are adjusted electronically.

39. The apparatus of claim 36, wherein the at least two axial weights are manually adjustable.

40. The apparatus of claim 36, wherein the at least two axial weights are adjusted electronically.

41. The apparatus of claim 36, wherein the at least two axial weights are threaded and the first and second bores are each threaded and the axial weights are adjusted by threading them along the first and second bores, respectively.

42. The apparatus of claim 36, wherein the at least two axial weights are secured in place using pressure.

43. The apparatus of claim 36, wherein the at least two axial weights have a magnetic relationship with the main shaft that allows the one or more axial weights to be moved along a length of the first and second bores and held in place magnetically.

44. The apparatus of claim 36, wherein the at least one eccentric weight is positioned to cause an offset in the center of gravity of the spherical sensor apparatus.

45. The apparatus of claim 36, wherein the at least one eccentric weight is positioned to cause zero center of gravity offset of the spherical sensor apparatus.

46. The apparatus of claim 36, wherein the at least one eccentric weight is formed to be heavier at the farthest point from the at least two eccentric weighted shafts.

47. The apparatus of claim 36, further comprising:
a plurality of sensors located in the first hemisphere and the second hemisphere.

48. A sensor assembly balance system, comprising:
a sensor block separated in two parts;
a central shaft connecting the two parts of the sensor block;
a plurality of eccentric weights surrounding the central shaft and independently moveable around the shaft providing two degrees of balance of the balance system;
wherein each eccentric weighted shaft includes at least one eccentric weight; and
a plurality of axial weights within the central shaft that are moveable along the central shaft and provide a third degree of balance of the balance system;
wherein the balance system is floated in a near frictionless environment to allow motion in all directions and balance adjustments without disassembly.

49. A three-dimensional balance assembly, comprising:
a center shaft;
two or more eccentric weighted shafts encompassing the center shaft; and
wherein each eccentric weighted shaft includes at least one eccentric weight;
wherein the two or more eccentric weighted shafts are independently rotatable around the center shaft to balance the assembly in two dimensions;
a first and a second locking mechanism that lock each weighted shaft into any rotational location;
wherein the center shaft includes a first and a second bore extending inwardly from each end of the center shaft;
wherein the first and second bores are adapted to receive and secure one or more axial weights and balance the assembly in a third dimension;
a transceiver able to receive and send electronic signals;
one or more servos coupled to the transceiver that control the two or more eccentric weighted shafts and the one or more axial weights to move them to the desired positions to provide three dimensional balancing; and
a plurality of sensors that are coupled to the transceiver and provide information to the transceiver necessary to make adjustments to obtain three dimensional balancing and navigational guidance.

50. A method of three dimensional balancing of a sensor assembly, the method comprising:
rotating two or more eccentric weighted shafts around a center shaft so that the sensor assembly is balanced in two dimensions;
locking the two or more eccentric weighted shafts in any rotational location; and adjusting one or more axial balance weights located inside the center shaft to provide axial balance of the sensor assembly in a third dimension;

wherein the sensor assembly is three dimensionally balanced without disassembling the sensor assembly.

51. The method of claim 50, wherein rotating the two or more eccentric weighted shafts comprises manually rotating the two or more eccentric weighted shafts.

52. The method of claim 50, wherein rotating the two or more eccentric weighted shafts comprises electronically rotating the two or more eccentric weighted shafts.

53. The method of claim 50, wherein adjusting the one or more axial balance weights comprises manually adjusting the one or more axial balance weights along the central shaft.

54. The method of claim 50, wherein adjusting the one or more axial balance weights comprises electronically adjusting the one or more axial balance weights along the central shaft.

55. A three-dimensional balance assembly, comprising:

a center shaft;

two or more eccentric weighted shafts encompassing the center shaft; and wherein each eccentric weighted shaft includes at least one eccentric weight;

wherein the two or more eccentric weighted shafts are independently rotatable around the center shaft to balance the assembly in two dimensions;

a first and a second locking mechanism that lock each weighted shaft into any rotational location;

wherein the center shaft includes a bore extending the length of the center shaft;

wherein the bore is adapted to receive and secure an axial weight and balance the assembly in a third dimension.

* * * * *